United States Patent [19]

Marx

[11] Patent Number: 5,264,503

[45] Date of Patent: Nov. 23, 1993

[54] PHENOL-TERMINATED EPOXY RESIN WITH FUNCTIONAL ELASTOMER

[75] Inventor: Edward J. Marx, Houston, Tex.

[73] Assignee: Shell Oil Company, Houston, Tex.

[21] Appl. No.: 471,456

[22] Filed: Jan. 29, 1990

[51] Int. Cl.$^5$ .................. C08L 63/02; C08L 63/04
[52] U.S. Cl. .................. 525/530; 525/92; 525/109; 525/502; 525/438; 525/524; 525/525; 525/528; 525/529; 525/531
[58] Field of Search ............ 525/109, 502, 529, 530, 525/531, 92, 524, 525, 438, 528

[56] References Cited

U.S. PATENT DOCUMENTS

| | | | |
|---|---|---|---|
| 3,770,698 | 11/1973 | Riew | 260/47 |
| 3,926,904 | 12/1975 | Scola | 525/113 |
| 3,966,837 | 6/1976 | Riew et al. | 260/837 R |
| 4,176,142 | 11/1979 | Lewis et al. | 525/109 |
| 4,578,424 | 3/1986 | Goel | 525/109 |
| 4,736,010 | 4/1988 | Suzuki et al. | 528/103 |
| 4,767,832 | 8/1988 | Marx | 525/523 |
| 4,789,566 | 12/1988 | Tatsuno et al. | 427/388.2 |
| 4,804,581 | 2/1989 | Geary et al. | 525/109 |
| 4,916,174 | 4/1990 | Yoshizumi et al. | 523/436 |

FOREIGN PATENT DOCUMENTS

| | | | |
|---|---|---|---|
| 61-120875 | 6/1986 | Japan | 525/109 |
| 1407851 | 9/1975 | United Kingdom . | |

*Primary Examiner*—Robert E. Sellers

[57] ABSTRACT

An elastomer-modified phenolic composition is provided which is an reaction product of a phenolic compound and about 5 to about 35 weight percent, based on the total weight of the elastomer-modified phenolic compound, of a functionalized elastomer. Further, there is provided a composition comprising an epoxy resin and a curing agent for the epoxy resin comprising the elastomer-modified phenolic composition. The use of the elastomer-modified phenolic curing agent permits the preparation of low-viscosity powder coating formulations for impact-resistant coatings.

22 Claims, No Drawings

PHENOL-TERMINATED EPOXY RESIN WITH FUNCTIONAL ELASTOMER

BACKGROUND OF THE INVENTION

This invention relates to curable elastomer-modified epoxy resin-curative compositions and to coatings made from such compositions. In a specific aspect, the invention relates to chemically-modified phenolic curing agents employed to enhance the properties of epoxy resin powder coating formulations.

Rubber-modified epoxy resins are well known. Rubber modification, by blending or co-reacting elastomeric compounds, is employed to improve such physical properties of epoxy resins as toughness, low profile characteristics, flexibility, and adhesion, producing resins for improved corrosion and chip resistant coatings.

Powder coatings having corrosion and chip resistance are used in the automotive industry as primer coatings. Automobile and truck bodies, particularly wheel wells and lower portions of the bodies such as rocker panels, are susceptible to chipping by sand and gravel. Some of the chipping may eventually result in rusting. Since the chip-resistant primer coating is often placed between an electrodeposited primer layer directly on the metal and an outer topcoat layer, a chip-resistant primer also requires good intercoat adhesion. In some areas, such as wheel wells and underbodies, the chip resistant primer may not be topcoated, and thus must demonstrate good resistance to the effects of exposure.

Numerous organic solvent-based coating compositions useful as chip resistant primers have been proposed, as for example, in U.S. Pat. Nos. 4,581,424, 4,602,053, 4,608,313, and 4,614,683. However, these coating compositions have a high volatile organic compound (VOC) content, which poses a problem for industries attempting to meet governmental guidelines on VOCs.

Powder coatings, which have the advantage of very low VOC, have been suggested, as in U.S. Pat. No. 4,804,581, which discloses a coating composition comprising an elastomer-modified epoxy derived from a polyepoxide and from about 5 to about 35 weight percent of a functionally-terminated diene-containing polymer and a carboxy-functional polyester. Although the '581 disclosure teaches that epoxy resins used as powder coatings may be modified with up to about 35 weight percent functionally-terminated diene-containing polymer, it has been found that high levels of rubber modifier in the epoxy resin contributes to stability and viscosity problems in the composition.

It is therefore an object of the invention to provide an epoxy resin composition useful in coating applications. It is another object of the invention to provide curing agents for epoxy resin-based powder coating compositions. It is yet another object of the invention to provide low-viscosity rubber-modified powder coating formulations.

BRIEF SUMMARY OF THE INVENTION

According to the invention, there are provided elastomer-modified phenolic compositions derived from phenolic compounds and from about 5 to about 35 weight percent, based on the weight of the elastomer-modified phenolic composition, of a functionalized elastomeric polymer.

Further according to the invention, there is provided a composition comprising (a) an epoxy resin and (b) an elastomer-modified phenolic curing agent for the epoxy resin, the curing agent derived from a phenolic compound and from about 5 to about 35 weight percent of a functionalized elastomeric polymer. It has been found that low-viscosity powder coating formulations can be prepared by incorporating the elastomeric moiety into the phenolic curing agent component of the formulation.

DETAILED DESCRIPTION OF THE INVENTION

The invention phenolic curing agents are compounds comprising an elastomeric moiety and an average of at least about 1.5 terminal reactive phenolic hydroxyl groups. The preferred curing agents have a number average molecular weight within the range of about 600 to about 5,000 and a phenolic equivalent weight from about 300 to about 2000.

The elastomeric moiety is preferably a derivative of a functionalized elastomeric polymer (hereinafter "functionalized elastomer"). Suitable functionalized elastomers are generally any elastomers functionalized at the end or middle portion of the elastomeric molecule. Suitable functional groups include, for example, carboxy, amino, hydroxyl, epoxy, mercaptan, anhydride and isocyanate. Suitable examples of end-group modified elastomers are any of the functionally-terminated elastomeric polymers such as a functionally-terminated diene-containing polymer. Such functionally-terminated diene-containing polymers useful in modifying the phenolic curing agent and the epoxy resin component are preferably of the formula X-B-X wherein B is a polymer backbone polymerized from material selected from $C_4$ to $C_{10}$ dienes; a $C_4$ to $C_{10}$ diene and a vinyl aromatic monomer (e.g., styrene, an alkyl-substituted styrene, a halo-substituted styrene and the like); a $C_4$ to $C_{10}$ diene and a vinyl nitrile (e.g., acrylonitrile or methacrylonitrile); a $C_4$ to $C_{10}$ diene, a vinyl nitrile and a vinyl aromatic monomer; or a $C_4$ to $C_{10}$ diene, a vinyl nitrile and an acrylate of the formula $CH_2=CR-COOR^1$ wherein R is hydrogen or a $C_1$ to $C_{10}$ alkyl. X can be any functional group that can react with a phenolic hydroxyl or an oxirane. Suitable X include, for example, carboxy, amino, hydroxyl, epoxy, mercaptan, anhydride and isocyanate groups.

Suitable examples of functionally-terminated diene-containing polymers include carboxyl-terminated polybutadiene, carboxyl-terminated polyisoprene, carboxyl-terminated poly(butadiene-acrylonitrile) (CTBN), carboxyl-terminated poly(butadiene-styrene-acrylonitrile), carboxyl-terminated poly(butadiene-acrylonitrile-acrylic acid) and carboxyl-terminated poly(butadiene-styrene) and carboxyl-terminated poly(styrene-butadiene-isoprene-styrene). Preferably the functionally-terminated diene-containing polymer is carboxyl-terminated polybutadiene, carboxyl-terminated poly(butadiene-acrylonitrile), carboxyl-terminated poly(butadiene-acrylonitrile-acrylic acid), with carboxyl-terminated poly(butadiene-acrylonitrile) being the most preferred. Other suitable examples include amine-terminated polybutadiene, amine-terminated poly(butadiene-acrylonitrile) (ATBN), amine-terminated poly(butadiene-styrene-acrylonitrile), amine-terminated poly(butadiene-acrylonitrile-acrylic acid), amine-terminated poly(isoprene-styrene), amine-terminated poly(styrene-butadiene-isoprene-styrene), maleated poly(styrene-butadiene), maleated poly(styrene-isoprene), epoxy-terminated polybutadiene, epoxy-terminated poly(styrene-butadiene), hydroxy-terminated polybutadiene, hydroxy-terminated polyisoprene, hydroxy-terminated poly(styrene-butadiene), mercapto-terminated polybutadiene and mercapto-terminated poly(styrene-butadiene).

Suitable elastomers functionalized at a middle portion include, for example, carboxylated polybutadiene, carboxylated polyisopene, carboxylated poly(butadiene-isoprene), carboxylated poly(butadiene-styrene), carboxylated poly(isoprene-styrene), mid-block carboxylated poly(styrene-ethylene/butadiene-styrene), amidated poly(butadiene-styrene), mercaptopolybutadiene, epoxidized polybutadiene, epoxidized poly(butadiene-styrene).

Commercial examples of suitable functionalized elastomeric polymers include HYCAR® carboxy-terminated liquid polymers manufactured by BF Goodrich and carboxylated KRATON® thermoplastic elastomers manufactured by Shell Chemical Company.

The functionalized elastomer can be a hydrogenated polymer in which the backbone is hydrogenated. The elastomer can be a random, a block, a radical or a star copolymer. The number average molecular weights of the functionalized elastomeric polymers are preferably within the range of about 1,000 to about 50,000.

The most preferred functionalized elastomer, the carboxyl-terminated butadiene-acrylonitrile copolymer, generally includes 0 to about 30 weight percent acrylonitrile and from about 70 to about 100 weight percent butadiene, preferably from about 10 to about 26 weight percent acrylonitrile and from about 74 to about 90 weight percent butadiene. In addition to the terminal carboxyl groups, other functional groups such as amino, phenolic, hydroxyl, epoxy, mercaptan or anhydride may be pendent on the chain. Typically, the functionality of the functionally-terminated diene-containing polymer has a value within the range of about 1.1 to about 2.5, preferably within the range of about 1.8 to about 2.3. Generally, carboxyl-terminated butadiene-acrylonitrile copolymers have number average molecular weights in the range of about 3,000 to about 5,000, preferably in the range of about 3.200 to about 4,300. Commercial examples of such polymers include those available from B. F. Goodrich under the trade mark HYCAR.

The elastomer-modified phenolic curing agent of the invention is derived from a phenolic compound and from about 5 to about 35 weight percent, based on the weight of the elastomer-modified phenolic curing agent, of a functionalized elastomeric polymer. Phenolic compounds suitable for advancement reactions and for the preparation of the elastomer-modified curing agents are polyhydric phenols, including dihydric phenols having two hydroxyl groups attached to an aromatic or polyaromatic nucleus, such as, for example, resorcinol, catechol, 2,2-bis(4-hydroxyphenyl)propane, 4,4'-sulfonyldiphenol and dihydroxy diphenyl methane. Preferred dihydric phenols are bis(hydroxyphenyl)alkanes, such as, for example, 2,2-bis(4-hydroxyphenyl) propane; 2,2-bis(4-hydroxy-tert-butylphenyl) propane; 1,1-bis(4-hydroxyphenyl) ethane; 1,1-bis(4-hydroxyphenyl) isobutane; 2,2-bis(4-hydroxytertiarybutyl phenyl) propane; bis(2-hydroxynapthyl) methane; 1,5-dihydroxynaphthalene; 1,1-bis(4-hydroxy-3-alkylphenyl) ethane and the like.

The preparation of the elastomer-modified phenolic compound may be conducted by any suitable method, but is generally carried out by a catalyzed addition reaction between the functional groups of the elastomeric material and the oxirane groups of an epoxy or the phenolic hydroxyl of a phenolic compound. The reaction can, if desired, be conducted in a suitable solvent with the product subsequently isolated.

The elastomer-modified phenolic curing agent is generally prepared by reacting an epoxy resin with a functionalized elastomer and an equivalent excess, with respect to the epoxy resin of a polyhydric phenol in order to obtain a product having terminal hydroxyl groups and a phenolic equivalent weight from about 300 to about 2000, preferably from about 400 to about 1000. For example, the preferred modified phenolic curing agent can be prepared from a phenolic compound that is the product of reacting a stoichiometric excess of a dihydric phenol with a linear diepoxy resin in the presence of a catalyst as described in U.S. Pat. No. 4,767,832, the disclosure of which is herein incorporated by reference. The functionalized elastomeric polymer can be added concurrently with the linear diepoxy resin or the dihydric phenol to a reactor and reacted together in one step. Alternatively, the polymer, diepoxy resin and the dihydric phenol can be added to a reactor in sequence and reacted stepwise.

For example, for a functionalized elastomeric polymer reactive with an oxirane, such as CTBN, the elastomer should be added before all of the epoxy is consumed. An equivalent excess of the phenolic compound, epoxy resin and elastomer can be concurrently reacted, or the epoxy resin and elastomer can be reacted and an excess equivalent of the phenolic compound subsequently added to the mixture. Alternatively, a phenolic compound and epoxy resin can be added to the reactor prior to adding the polymer, additional epoxy resin and additional phenolic compound. Various combinations of the above steps can be employed, so long as the objective of an elastomer-modified compound having an average of at least about 1.5 terminal reactive phenolic hydroxyl groups is achieved. To achieve this objective, the amount of the phenolic compound in the mixture will generally be greater than one molar equivalent to about 4 molar equivalent of the epoxy resin, in order to obtain the desired molecular weight range. Preferably the phenolic compound in the mixture is within the range of about 1.5 to about 2 molar equivalent of the epoxy resin.

For a functionalized elastomer reactive with a phenolic hydroxyl, such as epoxy-terminated diene containing polymers, the elastomer can be added with an equivalent excess of the phenolic compound with or without the presence of an epoxy resin. When the elastomer is added in the absence of the epoxy resin, an epoxy resin and equivalent excess of dihydric phenol may be subsequently added in order to obtain the desired phenolic equivalent weight for the elastomer-modified phenolic composition of about 300 to about 2000.

The reaction temperature and reaction time for the modification of the phenolic compound with the functionalized elastomer will depend upon the catalyst selected, but the reaction is generally conducted at a temperature within the range of about 40° C. to about 200° C., preferably within the range of about 140° C. to about 190° C., for a reaction time of about 0.5 to about 5 hours in order to achieve essentially complete consumption of the epoxy groups. A catalyst for the modification is added to the reaction mixture in amounts of about 0.01 to about 1.0 percent by weight. Suitable catalysts include tertiary amine catalysts such as tributylamine, quaternary ammonium salts such as tetrabutylammonium chloride, tertiary phosphates such as triphenylphosphate, quaternary phosphonium salts such as ethyltriphenyl phosphonium iodide, metal salts such as AMC-2 (a chromium octoate salt), and combinations of catalysts in staged reactions, with the quaternary phosphonium salts such as ethyltriphenyl phosphonium iodide being preferred. The reaction product of the phenolic compound, epoxy resin and the functionalized elastomeric polymer upon cooling is a friable solid having a phenolic equivalent weight in the range of about 300 to about 2,000, preferably in the range of about 400 to about 1,000. When the functionalized elastomer reactant is a carboxy-terminated diene-containing polymer, the acid value of the product is preferably less than about 1.

Generally the epoxy resin will have a 1,2-epoxy equivalency greater than one and preferably of about two or more. The epoxy resin may be linear or branched, saturated or unsaturated, aliphatic, cycloaliphatic, aromatic or heterocyclic. Examples of epoxy resins suitable for use in the invention include polyglycidyl ethers of polyhydric compounds, brominated epoxies, epoxy novolacs or similar polyhydroxyphenol resins, polyglycidyl ethers of glycols or polyglycols, and polyglycidyl esters of polycarboxylic acids. Preferably the epoxy resin is a polyglycidyl ether of a polyhydric phenol. Polyglycidyl ethers of polyhydric phenols can be produced, for example, by reacting an epihalohydrin with a polyhydric phenol in the presence of an alkali. Examples of suitable polyhydric phenols include: 2,2-bis(4-hydroxyphenyl)propane (bisphenol-A); 2,2-bis(4-hydroxy-tert-butylphenyl)propane; 1,1-bis(4-hydroxyphenyl)ethane; 1,1-bis(4-hydroxyphenyl)isobutane; 2,2-bis(4-hydroxytertiarybutylphenyl)propane; bis(2-hydroxynapthyl)methane; 1,5-dihydroxynaphthalene; 1,1-bis(4-hydroxy-3-alkylphenyl)ethane and the like. The preferred polyhydric phenol is bisphenol-A.

Commercial examples of suitable epoxy resins include advanced EPON® Resin 828, a product of Shell Chemical Company which is a diglycidyl ether of 2,2-bis(4-hydroxyphenyl)propane having an average molecular weight of about 380 and a weight per epoxy in the range of about 180 to about 195. Advancement of this liquid resin with bisphenol-A produces a solid resin highly suitable for powder coating formulations.

Further, it has been found that curable elastomer-modified epoxy resin compositions comprising (a) an epoxy resin and (b) an elastomer-modified phenolic curing agent derived from a phenolic compound and from about 5 to about 35 weight percent, based on the weight of the elastomer-modified phenolic curing agent, of a functionalized elastomeric polymer, can be utilized in corrosion and chip-resistant coating formulations. The epoxy resin can optionally, as desired in a particular formulation, be modified with up to about 20 weight percent of an elastomeric compound.

Epoxy resins suitable for use with elastomer-modified phenolic curing agents in powder coating applications, are generally any solid epoxy resin mentioned above. Liquid epoxy resins may be used provided that the are advanced to a solid state with, for example, bisphenol-A. The epoxy resin normally has an average weight per epoxide (WPE) within the range of about 500 to about 2000 and an average molecular weight within the range of about 1000 to about 3500. Higher WPE's and molecular weights may be used, provided that the resin is processable in the intended use, for example, in an extruder or melt compounder.

Elastomer modification of the epoxy resin may be conducted by any suitable method, but it is generally a catalyzed addition reaction between the functional groups of the elastomeric material and the oxirane groups of the epoxy. The reaction can be conducted in a suitable solvent. For powder coating usage, the product can be subsequently isolated. The epoxy resin may be modified with the functionalized elastomeric polymer first and then advanced, or the epoxy resin may first be advanced and then modified, or the advancement and modification may be done in one step. For example, EPON® Resin 828 can first be modified with a carboxyl-terminated butadiene-acrylonitrile polymer (CTBN) and then in a second step advanced with a less than stoichiometric amount, with respect to the epoxy resin, of bisphenol-A (BPA), or the EPON® Resin 828 can first be advanced with BPA and then modified with CTBN, or the EPON® Resin 828, CTBN and BPA can be charged to a reactor and reacted together in one step.

The reaction temperature and reaction time for the modification of the epoxy resin with a functionalized elastomeric compound will generally depend upon the catalyst selected, but the reaction is generally conducted at a temperature within the range of about 40° C. to about 200° C., preferably within the range of about 140° C. to about 180° C., for a reaction time of about 0.5 to about 5 hours. A catalyst for the modification is added to the reaction in amounts of about 0.01 to about 1.0 percent by weight, based on the total weight of the reaction mixture. The same catalysts as for phenolic modification are suitable, with the quaternary phosphonium salts such as ethyltriphenyl phosphonium iodide being preferred. The reaction product of the epoxy resin and the functionalized elastomeric polymer upon cooling is a friable solid having an epoxy equivalent weight in the range of about 500 to about 3,000, preferably in the range of about 700 to about 2,500.

In the curable elastomer-modified resin composition, the ratio, in equivalents, of the epoxy component (a) to the phenolic component (b) is generally within the range of about 0.7:1 to about 1:0.7, preferably within the range of about 1:0.8 to about 1:1. The ratio may be adjusted to compensate for the type of catalyst, cure conditions, and desired coating properties. The ratio takes into account competing epoxy homopolymerization reactions. Ratios outside the range can lead to low molecular weight cross-linked products with undesirable properties, e.g. low flexibility, low impact strength and low solvent resistance.

Generally the degree of modification of an epoxy resin with the functionalized elastomeric modifier will be limited by the melt viscosity of the modified resin. Table 1 shows the relationship between viscosity and percent of CTBN modifier for epoxy resins. The viscosity data at both 150° C. and 175° C. shows a marked increase in the viscosity when the composition contains about 25 weight percent or more of the modifier. Therefore, the epoxy resin will generally be modified with less than about 25 weight percent modifier. Preferably the epoxy resin can be modified within the range of 0 to about 20 weight percent functionalized elastomeric polymer. Low molecular weight epoxy resins modified with excess amounts of functionalized elastomeric polymer are generally not suitable for coating powder applications, because the functionalized elastomeric polymer tends to lower the glass transition point ($T_g$) of the resin, which below about 50° C. can result in sintering. To counter the lowering of the $T_g$, higher molecular weight epoxy resin must then be used, which results in flow problems, since the viscosity will be higher.

The degree of modification of the curing agent with the functionalized elastomeric modifier will as a practical matter be limited by the $T_g$ of the modified curing agent. Table 2 shows the relationship between $T_g$ and percent of CTBN modifier for a phenolic terminated curing agent. Curing agents modified with excess amounts of functionalized elastomer are generally not suitable for coating powder applications, because the functionalized elastomeric polymer tends to lower the glass transition point ($T_g$) of the curing agent, which, as described above for elastomer-modified epoxies, can result in sintering. Table 2 shows that above about 35 weight percent modifier, the $T_g$ will generally be below about 50° C. The curing agent will generally be modified within the range of about 5 to about 35 weight percent functionalized elastomeric polymer, preferably in the range of about 5 to about 30 weight percent. The most preferred amount of the functionalized elastomeric modifier in the elastomer-modified curing agent may vary considerably within the scope of the invention depending upon the amount of functionalized elastomer in the epoxy resin component, but is preferably in the range of about 5 to about 25 weight percent. In a composition in which the epoxy resin component contains about 10 weight percent CTBN, for example, the elastomer-modified curing agent most preferably contains about 8 to about 12 weight percent of CTBN. In a composition in which the epoxy resin component has no elastomeric modifier and components (a) and (b) are present in about equal amounts, the elastomer-modified curing agent most preferably contains about 18 to about 22 weight percent CTBN.

The modified curing agent of the invention can be used in conjunction with other curing agents such as, for example, amines, carboxy functional polyesters, polycarboxylic acids and other phenolics.

The epoxy resins and the phenolic curing agents utilized in the present invention may include other additives, e.g., catalysts, pigments, fillers, light stabilizers and antioxidants. When the resins and curing agents are used in a powder coating composition, such conventional powder coating additives as flow control agents, anti-popping agents, and powder flow materials may also be included.

For example, suitable as flow control agents are lower molecular weight acrylic polymers, i.e. acrylic polymers having a number average molecular weight from about 1000 to 50,000, such as polylauryl acrylate, polybutyl acrylate, poly(2-ethylhexyl)acrylate, poly(ethylacrylate-2-ethylhexyl-acrylate), polylauryl methacrylate and polyisodecyl methacrylate, and fluorinated polymers such as the esters of polyethylene glycol or polypropylene glycol and fluorinated fatty acids, polymeric siloxanes of molecular weights over 1000 may also be used as a flow control agent, for example, poly(dimethylsiloxane) or poly(methylphenyl)siloxane. Flow control agents can aid in the reduction of surface tension during heating of the coating powder and in elimination of crater formation. Generally, the flow control agent when used is present in amounts of from about 0.05 to 5.0 percent by weight based on the total weight of a powder coating composition.

Antipopping agents can be added to the composition to allow volatile materials to escape from the film during baking. Benzoin is a commonly preferred antipopping agent and when used is present in amounts from about 0.5 to 3.0 percent by weight based on total weight of a powder coating composition.

In addition, powder coating compositions may contain fumed silica as a powder flow additive to reduce powder caking during storage. An example of fumed silica is sold by Cabot Corporation under the trademark CAB-O-SIL. The powder flow additive when used is present in amounts ranging from about 0.1 to about 1.0 percent by weight based on the total weight of a powder coating composition. The powder flow additive is generally added to a powder coating composition during or after preparation of the particulate mixture.

The elastomer-modified powder coating compositions of the invention may optionally include a small percentage of catalysts in order to increase the crosslinking rate of such coating compositions. Baking temperatures will ordinarily be within the range of about 120° C. to 204° C. Suitable catalysts are quaternary ammonium salts, quaternary phosphonium salts, phosphines, and imidazoles. Examples include tetrabutylammonium chloride, tetrabutylammonium bromide or tetrabutylammonium iodide, ethyltriphenyl phosphonium acetate, triphenylphosphine, and 2-methylimidazole. The catalyst is generally present in the composition in amounts from 0 to about 5 weight percent, preferably from about 0.2 to 2 percent by weight, based on total weight of the coating composition.

In accordance with the powder coating embodiment of the invention, thermosetting chip-resistant powder coating compositions are prepared by melt blending the ingredients of the coating compositions. This can be accomplished by first dry blending the ingredients in a planetary mixer and then melt blending the admixture in an extruder at a suitable temperature within the range of about 80° C. to 130° C. The extrudate is then cooled and pulverized into a particulate blend.

The thermosetting chip-resistant coating powder composition can then be applied directly to a substrate of, e.g., a metal such as steel or aluminum. Non-metallic substrates such as plastics and composites can also be used. Application can be by electrostatic spraying or by use of a fluidized bed. Electrostatic spraying is the preferred method. The coating powder can be applied in a single sweep or in several passes to provide a film thickness after cure of about 2.0 to about 15.0 mils.

The substrate can optionally be preheated prior to application of a powder coating composition to promote uniform and thicker powder deposition. After application of the coating powder, the powder-coated substrate is baked typically at about 250° F. to about 400° F. (120° C. to 204° C.) from about 1 minute to 60 minutes, preferably at about 300° F. to about 400° F. from about 10 minutes to about 30 minutes.

The powder coating compositions can be applied directly upon bare metal, e.g., upon untreated, unprimed steel, or upon pretreated, i.e., phosphatized, unprimed steel. The powder coating compositions can also be applied upon phosphatized steel having a thin (0.8 mils to 2 mils) layer of an electrodeposited primer, cured or uncured before the application of the powder coating composition. The electrodeposited primer coating upon the metal substrate can be, for example, a cathodic electrodeposition primer composition such as UNIPRIME ® 3150 primer available from PPG Industries, Inc. In one aspect of the present invention, it is contemplated that the powder coating composition can be applied directly upon an uncured electro-deposited primer coating and the powder coating layer can be co-cured by heating at temperatures between 300° F. and 350° F. for from about 10 minutes to about 30 minutes.

The powder coating compositions of this invention exhibit improved flow characteristics compared to conventional powder coating compositions in which the elastomer modifier is incorporated in the epoxy component only. In addition, the powder coating compositions of the invention have excellent impact resistance as shown in Table 4.

After application and curing of the elastomer-modified powder coating composition, at least one topcoat layer can be applied over the coating layer. The topcoat can be, for example, a polyester-based coating cured with a melamine resin, an acrylic-based coating cured with a melamine resin, an acrylic and polyester containing coating cured with a melamine resin or an epoxy-based coating such as a glycidyl acrylate coating. The topcoat may be solvent-based, solventless, water-based or a powder coating. The elastomer-modified powder coating layers have excellent intercoat adhesion to such topcoats, as well as to an electrodeposited primer coating layer, thereby providing excellent chip resistance to the entire composite coating upon the metal substrate.

The invention composition can be used in automotive applications to provide desired anti-chip protection. For example, an automotive coating including an electrodeposited primer layer, a layer containing the elastomer-modified epoxy, and a topcoat layer can be used on those portions of a car susceptible to stone chipping. Similarly, a coating including an electrodeposited primer layer and a layer containing the elastomer-modified powder can be used as underbody coatings in areas which are generally not topcoated. The coated articles of the present invention can maintain chip resistance, corrosion resistance, and excellent intercoat adhesion throughout the temperature range, i.e., from about −10° F. to 100° F., and corrosive environments normally encountered by automotive vehicles. In addition, coatings including the layer containing the elastomer-modified epoxy upon the metal substrate and a topcoat layer thereon may be used in environments which are not typically as corrosive as automotive applications, e.g., appliance coatings, yet still provide chip resistance and excellent intercoat adhesion.

EXAMPLES 1-5

Table 1 below describes the compositions of five elastomer-modified epoxy resins and a standard prepared to demonstrate the relationship between viscosity and percent CTBN reacted in to an epoxy resin.

Epoxy resin component #1 represents an epoxy resin containing 10 weight percent of CTBN (available from B. F. Goodrich Co. as Hycar ® polymer).

Ten grams of CTBN 1300X8, 25.10 grams of bisphenol-A (BPA) and 64.90 grams of EPON ® Resin 828 (available from Shell Chemical Co.) in a 4 oz. open top metal container were heated on a 200° C. hot plate while stirring until all of the BPA melted. Subsequently, 0.06 gram of ethyl triphenyl phosphonium iodide catalyst was added and the temperature was gradually raised to 180° C., while stirring. The reaction was continued for three hours at approximately 180° C., at which point the container was removed from the hot plate and allowed to cool at room temperature. The resultant friable resinous material was broken into fine particles for subsequent evaluation.

Epoxy resin components #2-#5 were prepared under identical conditions except the ratios of EPON ® Resin, CTBN and BPA were varied as shown in Table 1.

The properties of these rubber-modified epoxy resins are compared to a non-elastomeric epoxy resin, prepared in a similar manner, in Table 1. As can be seen from the table, the introduction of more than about 20 weight percent elastomer into the epoxy resulted in unacceptably high melt viscosity.

TABLE 1

| | CTBN Modified Epoxy Resins | | | | | |
|---|---|---|---|---|---|---|
| | STD | 1 | 2 | 3 | 4 | 5 |
| | Composition | | | | | |
| CTBN 1300X8 (grams) | 0 | 10 | 15 | 20 | 25 | 30 |
| Bisphenol A | 27.89 | 25.10 | 23.71 | 22.31 | 20.92 | 19.52 |
| EPON ® Resin 828 | 72.11 | 64.90 | 61.22 | 57.69 | 54.08 | 50.48 |
| ETPPI | | | | (0.06) | | |
| TOTAL | | | | 100 | | |
| | Properties | | | | | |
| Equivalent Weight- | | | | | | |
| Calculated (epoxide) | 720 | 833 | 904 | 989 | 1091 | 1216 |
| Measured | 704 | 860 | 1090 | 1275 | 1288 | 1441 |
| Solution Viscosity, (40% Wt. in MEK), cP | 13.3 | (not determined, phase separation) | | | | |
| Melt Viscosity, poise @ | | | | | | |
| 150 C. | 24.8 | 49.6 | 75.2 | 104 | 405* | 606* |
| 175 C. | 7.5 | 15.0 | 26.0 | 38.0 | 140 | 212 |
| Glass Transition Point, DSC, Midpoint. °C. | 59.7 | 58.2 | 56.4 | 58.7 | 62.2 | 62.7 |
| Mettler Melt Point. °C. | 88.6 | 89.3 | 91.0 | 92.5 | 101.5 | 104.3 |

*Near Gel

EXAMPLES 6-10

Table 2 below describes the compositions of five elastomer-modified phenolic curing agents and a standard prepared to demonstrate the relationship between viscosity and percent CTBN added to a phenolic-terminated curing agent.

Elastomer-modified phenolic curing agent #6 represents a phenolic terminated curing agent containing 10 weight percent of CTBN (available from B. F. Goodrich Co. as Hycar ® polymer).

Ten grams of CTBN 1300X8, 42.9 grams of EPON ® Resin 828 (available from Shell Chemical Co.) and 47.1 grams of BPA in a 4 oz. open top metal container were heated on a 200° C. hot plate while stirring until all of the bisphenol-A melted. Subsequently, 0.06 gram of ethyl triphenyl phosphonium iodide catalyst was added and the temperature was gradually raised to 180° C. while stirring. The reaction was continued for three hours at approximately 180° C., at which point the container was removed from the hot plate and allowed to cool at room temperature. The resultant friable resinous material was broken into fine particles for subsequent evaluation.

Experimental elastomer-modified phenolic curing agents #7-#10 were prepared under identical conditions except the ratios of BPA, CTBN and EPON ® Resin were varied as shown in Table 2.

The properties of these elastomer-modified phenolic curing agents are compared to a standard non-elastomeric phenolic in Table 2. As can be seen from the table, the melt viscosity (150° C.) of the elastomer-modified phenolic remained at approximately 100 poise even in the upper portion of the range of elastomer modification.

TABLE 2

| CTBN Modified Linear Phenolic Curatives | | | | | | |
|---|---|---|---|---|---|---|
| | STD | 6 | 7 | 8 | 9 | 10 |
| Composition | | | | | | |
| CTBN 1300X8 (grams) | 0 | 10 | 15 | 20 | 25 | 30 |
| Bisphenol-A | 47.2 | 42.9 | 40.5 | 38.1 | 35.7 | 33.3 |
| EPON ® Resin 828 | 52.4 | 47.1 | 44.5 | 41.9 | 39.3 | 36.7 |
| ETPPI | | | | (0.06) | | |
| TOTAL | | | | 100 | | |
| Properties | | | | | | |
| Equivalent Weight- | | | | | | |
| Calculated (phenolic) | 720 | 765 | 793 | 824 | 857 | 894 |
| Measured | 718 | 713 | 706 | 711 | 726 | 739 |
| Solution Viscosity, (40% Wt. in MEK), cP | 22.5 | 30.1 | 32.1 | 36.3 | 40.0 | 48.4 |
| Melt Viscosity, poise @ | | | | | | |
| 150 C. | 117 | 109 | 108 | 99.2 | 89.0 | 95.1 |
| 175 C. | 25.0 | 25.4 | 27.2 | 28.4 | 29.2 | 33.9 |
| Glass Transition Point, DSC, Midpoint, °C. | 77.5 | 70.0 | 69.9 | 62.7 | 58.8 | 54.2 |
| Mettler Melt Point, °C. | 105 | 104 | 101 | 96.3 | 94.9 | 90.9 |

EXAMPLE 11

A solid epoxy resin containing ten percent rubber modification was prepared as follows: 651.5 grams of EPON ® Resin 828, (a liquid epoxy resin with epoxide equivalent weight of 188), 248.5 grams of bisphenol-A (equivalent weight 114) and 100.0 grams of CTBN 1300X8 (a carboxyl-terminated liquid polymer of butadiene/acrylonitrile) were placed in a two liter glass resin kettle. The kettle was fitted with a lid containing four openings for a stirrer, condenser, sparge tube and temperature indicator. An electric heating mantle surrounding the resin kettle was used to raise the temperature of the mixture to 90° C. in one hour. 0.3 grams of ethyl triphenyl phosphonium iodide (ETPPI) catalyst was then added and the mixture was raised to 160° C. in thirty minutes, allowed to exotherm and held at 170° C. for 3.5 hours. The product was poured into an aluminum pan to cool and solidify. The properties of this material are listed in Table 3 below.

EXAMPLE 12

A solid phenolic-terminated curing agent containing ten percent rubber modification was prepared as follows: 406.7 grams of EPON ® Resin 828, 493.3 grams of BPA and 100 grams of CTBN 1300X8 were placed in a two liter glass resin kettle. The apparatus and procedure were identical to that of Example 11, except 0.6 grams of ETPPI was used. The properties of this material are listed in Table 3 below.

EXAMPLE 13

A solid phenolic-terminated curing agent containing twenty percent rubber modification was prepared as follows: 838 grams of EPON ® Resin 828, 762 grams of BPA and 400 grams of CTBN 1300X8 were placed in a two liter glass resin kettle. The apparatus and procedure were identical to that of Example 11, except 1.2 grams of ETPPI catalyst was used. The properties of this material are listed in Table 3 below.

EXAMPLE 14

A solid epoxy resin was prepared as follows: 1358.2 grams of EPON ® Resin 828, 501.8 grams of BPA were placed in a two liter glass resin kettle. In an apparatus identical to Example 11, 1.1 grams of ETPPI catalyst was added after heating the initial mixture to 90° C. over an hour period. The mixture was then raised to 160° C. in one hour, allowed to exotherm and held for 1.5 hours at 170° C. 140 grams of EPON ® Resin DPS-155, an epoxy phenolic novolac resin, was then added and mixed with the previous material for 1.5 hours at 180° C. The homogenous product was poured into an aluminum pan to cool and solidify. The properties of this material are listed in Table 3 below.

EXAMPLE 15

A solid epoxy resin containing twenty percent rubber modification was prepared as follows: 584.6 grams of EPON ® Resin 828, 215.4 grams of BPA and 200 grams of CTBN 1300X8 were placed in a two liter glass resin kettle. The apparatus, procedure and level of ETPPI catalyst were identical to that of Example 11. The properties of this material are listed in Table 3 below.

TABLE 3

| | Example | | | | |
|---|---|---|---|---|---|
| | 11 | 12 | 13 | 14 | 15 |
| Epoxide Equivalent Wt. | 812 | — | — | 561 | 1075 |
| Phenolic Equivalent Wt. | — | 415 | 758 | — | — |
| Melt Viscosity @ 150 C., Poise | 53 | 28 | 134 | 18 | 160 |
| Mettler Melt Point, °C. | 91 | 91 | 100 | 84 | 95 |
| Glass Transition Point, DSC, Midpoint, °C. | 47 | 59 | 63 | 50 | 58 |

As can be seen from the table, the melt viscosities of the rubber-modified phenolic compositions (see examples 12 and 13) are lower than those of rubber-modified epoxy resin compositions (see example 11 and 15). In addition, the glass transition points of the rubber-modified phenolic compositions, when compared to the rubber-modified epoxy resin compositions at similar rubber content, are higher. The rubber-modified phenolic compositions with lower melt viscosities, when combined with epoxy resin compositions that are either rubber-modified or unmodified, lead to lower melt viscosity and higher flow formulated products. For example, this gives an advantage when a 10 percent rubber composition in a final product is desired. In order to obtain a 10 percent final rubber composition, for a conventional powder coating composition, a high melt viscosity 20 percent rubber containing epoxy resin (see example 15) must be used with a conventional curative. However, when the elastomeric moiety is incorporated in the lower melt viscosity elastomer-modified phenolic curative, a lower percent rubber incorporated epoxy resin or non-elastomeric epoxy resin which have lower melt viscosities than a 20 percent rubber-modified epoxy resin can be used. The lower overall viscosity results in improved flow.

In addition, the higher glass transition points of the rubber-modified phenolic compositions indicate that the neat and formulated products will have greater resistance to sintering.

EXAMPLES 16–17 AND COMPARATIVE EXAMPLES A AND B

Table 4 below compares the properties of various elastomer-modified powder coatings of this invention with those of conventional powder coating compositions. STD is a powder coating composition without any elastomer modifier. Example 16 is a powder coating composition of 10 weight percent CTBN modified phenolic curing agent and 10 weight percent CTBN modified epoxy resin component. Example 17 is a powder coating composition of 20 weight percent CTBN modified phenolic curing agent and epoxy resin without any elastomeric modifier. Comparative example A is a conventional epoxy resin cured with an acid functional polyester resin and comparative example B is a powder coating composition of an epoxy resin modified with CTBN combined with an acid functional polyester curing agent. A solid epoxy resin was used in all of the examples (solid powder coating resin, EPON ® Resin 2002 and with 10% polyacrylate flow control agent, EPON ® Resin 2002-FC-10 available from Shell Chemical Company).

The ingredients listed in Table 4 were each blended in a planetary mixer for about 2 to 3 minutes, then melt blended through a Buss PR-46 extruder. The extrudates were cooled on a chill roll, broken into chunks, and ground in a hammer mill to a fine powder. The powders were then sieved through a 100 mesh screen to remove any of the oversized particles.

The resultant powder coating compositions were electrostatically sprayed onto grounded steel panels using an electrostatic spray gun. A layer of about 2 mils ultimate thickness was applied and cured for 10 minutes in a 400° F. oven.

The performance of these elastomer-modified powder coatings are shown in Table 4 below. As can be seen from the performance data, the inclined plate flow (350° F.) of the powder coatings containing the elastomer-modified phenolic composition at approximately 44–63 mm are better than the elastomer-modified epoxy resin containing composition with a conventional curative (B). Higher inclined plate flow numbers generally indicate improved flow in coating applications. Surprisingly, the impact resistance of the powder coatings containing the elastomer-modified phenolic curatives are improved. The impact resistance at 350° F. is much better than that for the other typical powder coatings.

TABLE 4

| Elastomer Modified Powder Coating Compositions | | | | | |
|---|---|---|---|---|---|
| Example | STD | 16 | 17 | A | B |
| EPON ® Resin 2002 | 432 | 83 | — | 200 | — |
| EPON ® Resin 2002-FC-10 | 65 | 65 | 65 | 65 | 65 |
| Example 15 | — | — | — | — | 251 |
| Example 11 | — | 281 | — | — | — |
| Example 13 | — | — | 251 | — | — |
| Example 14 | — | — | 278 | — | — |
| EPON Curing Agent ® P-201** | 97 | — | — | — | — |
| EPON Curing Agent ® P-202** | 56 | — | 56 | — | — |
| Example 12 | — | 220 | — | — | — |
| Polyester resin* | — | — | — | 379 | 328 |
| Benzoin | — | — | — | 6 | 6 |
| 2-Methylimidazole | — | 1 | — | — | — |
| TiO$_2$ | 350 | 350 | 350 | 350 | 350 |
| Gel Time, sec. @ | | | | | |
| 176° C. | 290 | 229 | 204 | 240 | 182 |
| 202° C. | 131 | 103 | 93 | 105 | 82 |
| % Gloss @ | | | | | |
| 20° | 98 | 97 | 93 | 90 | 86 |
| 60° | 100 | 100 | 98 | 94 | 92 |
| Color: | | | | | |
| L (Whiteness) | 92.8 | 89.6 | 89.7 | 92.4 | 89.1 |
| a (Red/Green, +/−) | −1.1 | −1.2 | −1.0 | −1.1 | 0 |
| b (Yellow/Blue, +/−) | 3.3 | 4.2 | 5.5 | 0 | 5.8 |
| MEK Resistance | All passed 100 double rubs | | | | |

TABLE 4-continued

| Example | Elastomer Modified Powder Coating Compositions | | | | |
|---|---|---|---|---|---|
| | STD | 16 | 17 | A | B |
| Pencil Hardness | All gave scratch hardness values of 7H | | | | |
| Appearance, Smoothness, (1–5, best–worst) | 1 | 2–3 | 3 | 1–2 | 3 |
| Inclined Plate Flow: | | | | | |
| 10 Min. @ 400 F., mm | 75 | 49 | 34 | 63 | 36 |
| 20 Min. @ 350 F., mm | 78 | 63 | 44 | 56 | 35 |
| Impact, In. Lb: | | | | | |
| a) Direct | P160 | P160 | P150 | P100 | P160 |
| Reverse | P160 | P160 | P160 | P10 | P160 |
| b) Direct | P100 | P160 | P160 | P10 | P90 |
| Reverse | P30 | P160 | P160 | P10 | P30 |

*Acid functional polyester resin P-2230 available from DSM
**Advanced phenolic terminated curing agents available from Shell Chemical Company
a) Applied 2 mils films on type-S Q panels and cured for 10 minutes at 400 F.
b) Applied 2 mils films and cured 10 minutes at 350 F.

I claim:

1. A process for preparing an elastomer-modified phenolic composition comprising the steps of:
    (a) contacting, in a reaction mixture, (i) an epoxy resin having an average of about 2 epoxide groups per molecule, (ii) an equivalent excess with respect to said epoxy resin of a dihydric phenol, and (iii) a functionalized elastomer having an average of at least about 1.5 functional groups per molecule reactive with epoxide groups, in the presence of a catalyst at a temperature within the range of about 40° C. to about 200° C. for a time effective for essentially complete consumption of the epoxy groups and production of an elastomer-modified phenolic composition having an average of at least about 1.5 terminal phenolic hydroxyl groups per molecule and a phenolic equivalent weight within the range of about 300 to about 2000; and
    (b) recovering said elastomer-modified phenolic composition.

2. The process of claim 1 in which the functionalized elastomer is present in the reaction mixture in an amount of from about 5 to about 35 weight percent, based on the weight of the elastomer-modified phenolic composition.

3. The process of claim 2 wherein the dihydric phenol is bisphenol-A.

4. The process of claim 3 wherein the epoxy resin is a diglycidyl ether of a bisphenol.

5. The process of claim 2 wherein the functionalized elastomer is a mid-portion functionalized elastomer.

6. The process of claim 2 wherein the functionalized elastomer is an end-group modified elastomer.

7. The process of claim 1 in which the dihydric phenol is present in the reaction mixture in an amount of greater than one molar equivalent to about 4 molar equivalents of the epoxy resin.

8. The process of claim 7 in which the dihydric phenol is present in the reaction mixture in an amount within the range of about 1.5 to about 2 molar equivalents of the epoxy resin.

9. The process of claim 6 wherein the end-group modified elastomer is of the formula X-B-X wherein B is a polymer backbone polymerized from material selected from the group consisting of a $C_4$ to $C_{10}$ diene; a $C_4$ to $C_{10}$ diene and a vinyl aromatic monomer; a $C_4$ to $C_{10}$ diene and a vinyl nitrile, a $C_4$ to $C_{10}$ diene and a vinyl nitrile and a vinyl aromatic monomer; a $C_4$ to $C_{10}$ diene and a vinyl nitrile and a vinyl aromatic monomer; and a $C_4$ to $C_{10}$ diene and a vinyl nitrile and an (alkyl) acrylate; and X is selected from the group consisting of carboxy, amino, hydroxy, epoxy, mercaptan, anhydride and isocyanate groups.

10. The process of claim 9 wherein X is epoxy.

11. The process of claim 9 wherein X is amino.

12. The process of claim 9 wherein X is carboxy.

13. The process of claim 12 wherein the end-group modified elastomer is carboxy-terminated poly(butadiene-acrylonitrile).

14. The process of claim 1 in which the catalyst is a quaternary phosphonium salt.

15. A phenolic composition which is the product of the process comprising the steps of:
    (a) reacting an epoxy resin, an equivalent excess of a dihydric phenol with respect to said epoxy resin and from about 5 to about 35 weight percent of a functionalized elastomer having an average of at least about 1.5 functional groups reactive with epoxide groups per molecule in the presence of a catalyst at a temperature within the range of about 40° C. to about 200° C. for time effective for essentially complete consumption of the epoxy groups and production of a phenolic composition having an average of at least about 1.5 phenolic hydroxyl groups per molecule and a phenolic equivalent weight within the range of about 300 to about 2000; and
    (b) recovering said phenolic composition.

16. The composition of claim 15 wherein the dihydric phenol is bisphenol-A.

17. The composition of claim 16 wherein the epoxy resin is a diglycidyl ether of a bisphenol.

18. The composition of claim 15 wherein the functionalized elastomer is of the formula X-B-X wherein B is a polymer backbone polymerized from material selected from the group consisting of a $C_4$ to $C_{10}$ diene; a $C_4$ to $C_{10}$ diene and a vinyl aromatic monomer; a $C_4$ to $C_{10}$ diene and a vinyl nitrile, a $C_4$ to $C_{10}$ diene and a vinyl nitrile and a vinyl aromatic monomer; a $C_4$ to $C_{10}$ diene and a vinyl nitrile and a vinyl aromatic monomer; and a $C_4$ to $C_{10}$ diene and a vinyl nitrile and an (alkyl) acrylate; and X is selected from the group consisting of carboxy, amino, hydroxy, mercaptan, anhydride and isocyanate groups.

19. The composition of claim 18 wherein X is a carboxy group.

20. The composition of claim 19 wherein the functionalized elastomer is a carboxy-terminated poly(butadiene-acrylonitrile).

21. A phenolic composition which is the product of the process comprising the steps of:

(a) contacting in a reaction mixture a linear diepoxy resin, from greater than one molar equivalent to about 4 molar equivalent of a dihydric phenol with respect to said epoxy resin and from about 5 to about 35 weight percent of a functionalized elastomer having at least about 1.5 functional groups reactive with epoxide groups in the presence of an addition catalyst at a temperature within the range of about 40° C. to about 200° C. for time effective for essentially complete consumption of the epoxy groups and production of a phenolic composition having an average of at least about 1.5 terminal phenolic hydroxyl groups per molecule and a phenolic equivalent weight within the range of about 300 to about 2000; and (b) recovering said phenolic composition.

22. The composition of claim 21 wherein the diepoxy resin is a diglycidyl ether of bisphenol-A.

* * * * *